United States Patent Office 3,265,723
Patented August 9, 1966

3,265,723
PREPARATION OF ACRYLONITRILE DIMER
William Lee Lehn, Dayton, Ohio, and George Raymond Nacci, Wilmington, Del., assignors to E. I. du Pont de Nemours and Company, Wilmington, Del., a corporation of Delaware
No Drawing. Filed Sept. 18, 1963, Ser. No. 309,861
12 Claims. (Cl. 260—464)

This application is a continuation-in-part of application Serial No. 857,557, filed December 7, 1959, and now abandoned.

This invention relates to improved methods for the manufacture of acrylonitrile cyclic dimer.

Heretofore, acrylonitrile has been converted to cyclic dimer at elevated temperatures in the presence of hydroquinone, in a pressure-resisting vessel. In general, the process known heretofore gave very low conversions to cyclic dimer (about 5%), and the crude reaction product was seriously contaminated with tars.

An object of this invention is to provide an improved process for dimerizing acrylonitrile at higher rates and in improved conversion and yields.

It has been discovered in accordance with this invention that unexpectedly high rates of dimerization of acrylonitrile, at very markedly improved yield, are attained by carrying out the reaction at pressures of at least 1000 pounds per square inch, in the vapor phase. Optimum results are obtained at pressures of at least about 1200 pounds per square inch or higher, e.g. 1200 to 5000 pounds per square inch. Pressure can be controlled more satisfactorily in a continuous system than in a batch system. Temperatures in the range of about 250° to 350° C. are generally preferred with optimum results at close to 275° to 300° C. Temperatures as low as 200° C. can be used, but the reaction rate is relatively slower at this low temperature.

Certain precautions are necessary, or at least highly desirable, in obtaining the excellent results reported hereinafter. For example, particular materials of construction, such as stainless steel, are detrimental unless steps are taken to prevent the undesirable effect thereof on tar formation and on dimerization rate. These undesirable effects can be prevented by having present at least a small percentage (e.g. about 10% or more) of water; the pH of this water should be kept below about 8, and preferably on the acid side, since interference by a cyanoethylation reaction occurs in aqueous alkaline media, especially when the amount of water is excessive. Amines formed in situ are very undesirable, and amine acceptors, such as aqueous $CO_2$, or aqueous acids, such as sulfuric, phosphoric, and sulfurous acids, potassium hydrogen phosphates, oxalic, hydroxyacetic, trimethylacetic, propionic, butyric, succinic, acrylic, acetic acids, etc., are helpful. Aqueous solutions of water-soluble phenols are also helpful. In cases where ammonia is employed as a stabilizer for acrylonitrile, some or all of the acid is converted to ammonium salt. In fact, the ammonium salts, and also amine salts, may be introduced as the acidic additive.

A further surprising discovery is that these aqueous acids are highly beneficial even when stainless steel is not employed as the material of construction. Indeed, it has been found that certain aqueous acids are more effective in the presence of other materials of construction. For example, aqueous hydrochloric acid is beneficial when a platinum-lined reactor is used.

Copper is itself an undesirable material of construction in that it tends to slow down the dimerization and to cause production of tar. Silver-lined vessels may be used satisfactorily.

Frequently, an inert organic liquid medium is desirably present in the reaction medium. Examples of such media are aromatic hydrocarbons, cycloalkanes, saturated aliphatic hydrocarbons, etc.

The cyclic dimeric product obtained in accord with the process of this invention is substantially all 1,2-isomer, in its cis and trans forms. According to conclusions deduced from dipole moment measurements, the low melting solid, lower boiling form (B.P. 122°/6 mm.) is the trans isomer, and the solid, higher boiling form (B.P. 165°/6 mm.) is the cis isomer. The previously published literature evidently is erroneous in stating that the cis form is the low boiling isomer and that the trans is the high boiling form. The actual data are as follows:

| | Dipole moment, Debyes |
|---|---|
| High boiling isomer (cis) | 6.0 |
| Low boiling isomer (trans) | 4.3 |

The cis isomer is obtainable in pure form, free of the trans isomer by distillation, and (as made in Example 1) has a melting point of 68° C. Freedom from trans isomer was demonstrated by gas chromatography. The trans isomer was similarly freed of cis isomer by distillation, and when so isolated had a melting point of 28° C.

The invention is illustrated further by means of the following examples.

EXAMPLE I

Into a stainless steel shaker tube having a capacity of 325 cc. was placed a mixture of 160 grams of acrylonitrile and 20 ml. water. The reaction vessel was freed of air by evacuation, and was then closed. Into the vessel was injected carbon dioxide until the pressure reached 700 pounds per square inch. The vessel was agitated, and the temperature was raised to 275° C., whereupon the pressure increased to about 2850 pounds per square inch. The reaction was continued under these conditions for 30 minutes after which the vessel was cooled and the product was discharged. Distillation of the total product at a pressure of 6 millimeters gave 108 grams of recovered acrylonitrile monomer and 48 grams of dimer which distilled at a temperature of 120 to 165° C. This dimer fraction was composed of 2 isomers of 1,2-dicyanocyclobutane in the proportions of 1.25 lower melting isomer: 1.0 higher melting solid isomer, the latter having a boiling point of 165° C. at 6 mm.

EXAMPLE II

Into a stainless steel shaker tube having a capacity of 325 cc. was placed a mixture of 160 grams of acrylonitrile and 20 ml. water containing .2 gram phenol. This mixture was heated under a pressure of about 1200 pounds per square inch at 275° C. for 0.5 hour. The product was discharged from the reaction vessel, and 1.5 grams of solid was separated therefrom. Distillation of the resulting mixture gave 31.9 grams of acrylonitrile dimers and 125 grams of recovered acrylonitrile.

EXAMPLE III

A mixture consisting of 120 grams of acrylonitrile and 15 grams of 0.001 $NH_2SO_4$ was heated at 275° C. for 30 minutes under a pressure of about 1200 pounds per square inch in a stainless steel vessel. The resulting product contained 2.8 grams of solids. These were removed and the remaining mixture was distilled yielding 88 grams of recovered acrylonitrile and 28.4 grams of acrylonitrile dimer.

EXAMPLE IV

A mixture consisting of 160 grams of acrylonitrile and 20 ml. water was placed in a stainless steel reaction vessel of 325 ml. capacity. The mixture was subjected to diminished pressure for removal of air following which carbon dioxide was injected until the pressure reached 15 pounds per square inch. The resulting mixture was heated under an autogenous pressure of about 1500 pounds per square inch at 275° C. for 30 minutes following which the contents of the reaction vessel were discharged, and 9.4 grams of solid material were separated therefrom. Upon distillation, the remaining mixture yielded 120 grams of acrylonitrile and 28.9 grams of acrylonitrile dimer.

EXAMPLE V

Twenty ml. of water having a pH of 6.5 was mixed with 160 grams of acrylonitrile and placed in a stainless steel reaction vessel. A vacuum was applied for removal of air following which the contents of the vessel were heated at a pressure of about 1200 pounds per square inch at 275° C. for 30 minutes. At the end of this time the contents of the reaction vessel were withdrawn and the water layer, which was present in the mixture, was found to have a pH of 7.1. The product contained 1.6 grams of solids, 37.9 grams of acrylonitrile dimer, and 120 grams of unreacted acrylonitrile.

The foregoing examples illustrate the invention in several of its preferred embodiments.

Optimum results are obtained using aqueous acid in a stainless steel reactor, by continuing the reaction until at least about 10% of the acrylonitrile is converted to dimer. Yields are about 90 to 100% at 10 to 50% conversion to dimer, although even higher conversions can also be attained.

The following table shows the results obtained in 0.5 hour runs at acrylonitrile pressures of at least 1200 pounds per square inch in the presence of various amounts of water, at 275° C.

TABLE—EFFECT OF VARIOUS AQUEOUS ADDITIVES ON ACRYLONITRILE DIMERIZATION

| Run No. | Material of Construction | Additive | Total Acrylonitrile Reacted, percent | Yield of Dimer, percent of Reacted Acrylonitrile | Remarks |
|---|---|---|---|---|---|
| 1 | Stainless Steel | Water (1 part by weight per unit weight of acrylonitrile). | 27.4 | 61.5 | Asphalt-like by-product. |
| 2 | do | Water (10%) plus 15 p.s.i. $CO_2$ | 23.8 | 70 | |
| 3 | do | Water (10%) plus 100 p.s.i. $CO_2$ (initial pressure). | 21.9 | 86 | |
| 4 | do | Water (10%) plus 700 p.s.i. $CO_2$ (initial pressure). | 28.2 | 94 | No tar, 2.6 g. solid by-product. |
| 5 | do | Water (10%) plus 500 ats. $CO_2$ (initial pressure). | 27.2 | 90 | Light yellow color. |
| 6 | do | Water (10%) plus 1.0% of phenol, on wt. of water. | 21.0 | 95 | |
| 7 | do | 0.001 N aqueous $H_2SO_4$ (10%) | 26.1 | 91 | |
| 8 | do | N aqueous acetic acid (10%) | 15.9 | 94 | |

The aqueous acids employed in the table were used in quantities corresponding to 10% of the weight of acrylonitrile, while the water (Run No. 1) was present to the extent of 100% of the weight of acrylonitrile, but as the amount of water becomes excessive, particularly at long reaction times, especially at elevated temperatures within the disclosed range, the formation of tar in detrimental quantities is noted. The preferred range of water content is between about 10% to about 50% of the weight of acrylonitrile, although as shown in the table about 10% to about 100% is satisfactory.

The dimeric products obtained in the practice of this invention are valuable and useful since they can be converted to adiponitrile (a nylon intermediate) by reaction with hydrogen at atmospheric pressure in the presence of a reduced cobalt oxide catalyst at 175 to 400° C., in short reaction times (1 to 20 seconds).

What is claimed is:

1. The process which comprises the steps of heating acrylonitrile in the presence of water at a pH within the range of the pH of acrylonitrile containing 10% N aqueous acetic acid and a pH of 8, at a temperature of 250° C. to 350° C. at a pressure between 1000 pounds per square inch and 5000 pounds per square inch for a reaction time not in excess of 0.5 hour but sufficient to convert some acrylonitrile to 1,2-dicyanocyclobutane, the quantity of water being from about 10% to about 100% by weight of the acrylonitrile charged, and thereafter separating 1,2-dicyanocyclobutane.

2. The process of claim 1 in which the pH is less than 7, and some of the acrylonitrile is in the vapor phase during the heating step, and the quantity of water is between 10 and 50% by weight of the acrylonitrile charged.

3. The process which comprises heating a mixture consisting essentially of acrylonitrile and water at a pH within the range of the pH of acrylonitrile containing 10% N aqueous acetic acid and a pH of 8, at a temperature of 250° C. to 350° C. at a pressure between 1000 pounds per square inch and 5000 pounds per square inch for a reaction time not in excess of 0.5 hour but sufficient to convert some acrylonitrile to 1,2-dicyanocyclobutane, the quantity of water being from about 10% to about 100% by weight of the acrylonitrile charged, and thereafter separating 1,2-dicyanocyclobutane.

4. The process of claim 3 in which the pH is less than 7, and the amount of water is between 10% and 50% by weight of the acrylonitrile charged.

5. The process of claim 4 in which the reaction time is in the range of 0.08 to 0.5 hour, and some of the acrylonitrile is in the vapor phase during the heating step.

6. The process for preparing 1,2-dicyanocyclobutane, which comprises the steps of heating a mixture containing acrylonitrile and water kept at a pH between the pH of an aqueous mixture of 120 grams of acrylonitrile and 15 grams of 0.001 N $H_2SO_4$ and a pH of 7, at temperature of between about 250° C. and 350° C. at a pressure of between 1000 and 5000 pounds per square inch for a reaction time of between 0.08 hour and 0.5 hour, the quantity of water being from about 10% to about 50% of the weight of the acrylonitrile charged, and thereafter separating 1,2-dicyanocyclobutane from the resulting mixture.

7. The process of claim 6 in which the reaction is carried out until at least 10% of the acrylonitrile charged has been converted to 1,2-dicyanocyclobutane, and in which some of the acrylonitrile is in the vapor phase during the heating step.

8. The process of claim 6 in which the pH is kept at a pH below 7 by the addition of phenol, $C_6H_5OH$.

9. The process of claim 6 wherein the pH is kept below 7 by the addition of $CO_2$.

10. The process of claim 6 in which the pH is kept below 7 by the addition of aqueous sulfuric acid.

11. The process of claim 6 in which the pH is kept below 7 by the addition of acetic acid.

12. A process which comprises the steps of heating acrylonitrile in the presence of an amount of water between about 10% and about 100% by weight of the acrylonitrile charged, at a pH of less than 8, at a temperature between 250° C. and 350° C. at a pressure between 1000 p.s.i. and 5000 p.s.i., for a time not in excess of 0.5 hour but sufficient to convert some of the acrylonitrile to 1,2-dicyanocyclobutane, and thereafter separating 1,2-dicyanocyclobutane.

References Cited by the Examiner

UNITED STATES PATENTS 3,096,360   7/1963   Sennewald et al. _____ 260—464

OTHER REFERENCES

Coyner et al., JACS, 71, pp. 324–326 (1949).

CHARLES B. PARKER, *Primary Examiner.*

JOSEPH P. BRUST, *Assistant Examiner.*